United States Patent [19]

Hullender

[11] Patent Number: 5,151,950
[45] Date of Patent: Sep. 29, 1992

[54] METHOD FOR RECOGNIZING HANDWRITTEN CHARACTERS USING SHAPE AND CONTEXT ANALYSIS

[75] Inventor: Gregory N. Hullender, Foster City, Calif.

[73] Assignee: Go Corporation, Foster City, Calif.

[21] Appl. No.: 607,125

[22] Filed: Oct. 31, 1990

[51] Int. Cl.$^5$ .......................... G06K 9/00; G06K 9/62; G06K 9/72; G06K 9/46
[52] U.S. Cl. ........................................ 382/13; 382/15; 382/37; 382/25; 382/39; 382/40
[58] Field of Search ...................... 382/3, 13, 37, 9, 14, 382/15, 25, 40, 39

[56] References Cited

U.S. PATENT DOCUMENTS 4,589,142  5/1986  Bednar ................................. 382/37

Primary Examiner—Michael Razavi
Assistant Examiner—Michael Cammarata
Attorney, Agent, or Firm—Matthew C. Rainey

[57] ABSTRACT

An improved pattern recognition system, using an improved method for merging low-level recognition information with auxiliary contextual information such as a Deterministic Finite Automaton (DFA). The system comprises a low-level shape recognizer for handwriting input, an English Language dictionary organized as a Trie (a special type of DFA), and software to merge the results of the two. An input of digitized handwriting strokes is translated into characters using the shape recognizer and the Trie in tandem, allowing the system to reject nonsense translations at the earliest possible stage of the process and without the overhead traversing the trie from the top with each translation.

13 Claims, 2 Drawing Sheets

METHOD FOR RECOGNIZING HANDWRITTEN CHARACTERS USING SHAPE AND CONTEXT ANALYSIS

BACKGROUND OF THE INVENTION

The area of this patent is mechanical pattern recognition. This would include but not be limited to hardware and software for performing computer speech recognition, optical character recognition, and computer handwriting recognition.

STATEMENT OF RELATED ART

A large class of pattern recognition algorithms can be described as "tree traversals." By way of example, consider a printed-handwriting recognition system that tries to convert a series of digitized points into letters and words. It divides the points into strokes and attempts to assign a letter to each stroke (or sequence of strokes). It then attempts to assemble these letters into words.

The strokes-to-letters problem is greatly complicated by the fact that letters vary greatly in size, the smallest being single strokes (such as the letter 'o') and the largest being as many as five or six strokes (such as capital 'E'). So the system starts with the first stroke and hypothesizes several choices for it, including some that require more than one stroke. These choices will affect future choices later in the translation process. For this reason, the system cannot discard any of the initial hypotheses until it has analyzed more of the strokes beyond them.

For example, consider an input of "Hippopotamus" where the bar on the 'H' doesn't quite reach the right vertical (so that it looks like a 'tl', the first 'o' is open at the top (so it looks like an 'u'), the second 'o' spirals in (so it looks like a capital 'G'), the 't' is tilted (so it looks like an 'x') the 'a' is open to the right (so it looks like a 'c'), the 'm' has a strong downstroke and a weak tail, so it looks like a 'w', and the downstroke on the 'u' is widely separated from the body of the letter (so it looks like an 'n'). Since there are two choices for each of seven letters, there are 128 different possible translations, from a letter basis alone, only one of which actually forms a real word.

Systems in the prior art, such as ("A Verifier of Lexical Hypotheses in a Speech Recognition System"; Silvano Rivoira and Piero Torasso; Proceedings of the International Conference on Cybernetics and Society; Oct. 8-10, 1979; IEEE Systems, Man, and Cybernetics Society) and ("A multi-level perception approach to Reading Cursive Script"; Sargur N. Srihari and Radmilo M. Bozinovic; Artificial Intelligence 33; 1987; Elsevier Science Publishers B. V.; North Holland) work by assigning a measure of likelihood to each character hypothesis and first taking the most likely hypothesis, but storing the others on a stack, then repeating the analysis on the remainder of the strokes and keeping a cumulative probability until that probability gets too low or until the end of the data is reached. (The above references are incorporated herein by reference.) At that point, it then backs up and tries the other possibilities until it has tried everything. It then picks the combination that had the best score. This is called a search tree because of all the branches at the decision points.

For our "Hippopotamus" example, the search tree might look like the following example. First, it scans straight to the end, looking at the possibilities at each position and keeping them in order from most to least likely. (In this example, we never had more than two possibilities for any one position):

| tl | i | p | p | u | p | o | x | c | w | n | s |
|----|---|---|---|---|---|---|---|---|---|---|---|
| H  |   |   |   | o |   | G | t | a |   | m | u |

Having reached the end of the input, it could simply put out the "most probable" entry, "tlippupoxcwns", but that's obviously not adequate. Prior art often uses Deterministic Finite Automata (DFA's) (*Compiler Design*, Aho and Ullman, Addison Wesley) or Trie-structured dictionaries (*The Art of Computer Programming*, Vol 3; Knuth; Addison Wesley) to represent specific allowed (or expected) input. These references are incorporated herein by reference. A prior art system might use a dictionary of English to validate results (or at least, to choose among them), and since "tlippupoxcwns" isn't in the dictionary, the system would know to keep looking. In this case, however, the system will try 110 nonsense words before it gets to "Hippopotamus." (The first few will look like this:

```
tlippupoxcwns
tlippupoxcwus
tlippupoxcmns
tlippupoxcmus
tlippupoxawns          etc.)
```

Prior art uses other heuristics to reduce the search, such as noting that combinations such as "tl" and "cw" are unusual and not considering them. This makes the problem manageable, but leads to other problems (such as an inability to recognize words like "bottle.")

Another approach would be to use the dictionary from the beginning and reject (or at least defer) any alternative which would make the prefix (the word so far) deviate from the dictionary. For example, no words begin with "tl", so it's safe to select 'H' over 'tl' in the first position. Unfortunately, this requires accessing the dictionary at each decision point, and the time involved is proportional to the length of the word up to that point, so the total time required is proportional to the square of the length of the word. In the case of Hippopotamus, the savings are worth the cost, but in general, the cost is so heavy that prior art never uses this technique.

In the situation where the input may consist of multiple words, this problem is greatly aggravated because at many points the possibility that any given letter may be followed by a space must also be included.

It will be apparent to one skilled in the art that this represents a very large class of difficult problems and is not strictly limited to Handwriting Recognition. Examples include Optical Character Recognition, Speech Recognition, Radar or Sonar Analysis, and any other system that requires a mostly-linear, not-100%-reproducible data stream be matched against a set of expected patterns.

For Handwriting Recognition, we would like to use a trie-structured dictionary (possibly more than one) and/or a DFA to restrict the possible input. (For example, number format with commas, decimal points etc. is best expressed by a DFA). But as described above, prior art must either use these as a post-processing step, after the recognition algorithm has already narrowed the possibilities down to a relative handful of choices (running the risk of missing the correct word), or it must devote tremendous computational resources to checking the dictionary at every decision point.

SUMMARY OF THE INVENTION

In the present invention, a trie or DFA is organized in such a way that each node or state can be entered independently. That is, all that is required to represent a state or node is a pointer to it (i.e. a machine address). Further, for the trie, each of the characters that defines an arc to an adjacent node is immediately available, and for the DFA, each allowed transition character must be easily available from the pointer to the state.

In other words, we can jump into the middle of a trie or DFA; we don't have to start from the top and work our way down. FIG. 1 illustrates a traditional trie; and FIG. 2 illustrates a trie organized by state.

We then evaluate hypotheses according to the prior art, except that at each decision point (even if there is only one choice from the recognition system), we generate a separate set of choices from the trie-based dictionary which we use to augment the list from the rest of the system. Each of those choices comes with a pointer back into the trie, so that when and if any of them is explored, we can jump directly into the trie and proceed from where we left off.

For example, in the "Hippopotamus" example, the first choices from the stroke information were 't' and 'H', while the first set of choices from the trie will be every letter from 'a' to 'z' (upper and lower case), representing the fact that there are words that begin with all letters. We only keep the 't' and the 'H' entries, since those are the only ones that came back from the hypothesis generator. The next generated letter is 'l' (following the 't'). Exploring possibilities from t' gives us 'aehioruy' as second letters, which does not include 'l', so we back up to 'H'. The next letter after 'H' is 'i', and 'H' may be followed by 'aeiouy", so 'i' is accepted and we proceed to the end of the word. At every step from this point, we select the correct entry at each decision point, since Hippu-, HippopG-, Hippopox-, Hippopotc-, Hippopotaw-, and Hippopotamn- are all invalid word prefixes (i.e. no English words begin like that). Because we only go back to the dictionary for one character at a time, our total character lookup is only slightly greater than it would have been to look up a single word one time.

We also store the relative probabilities of each letter in the trie (where such are available) and combine that with the probabilities generated in the recognition engine. For example, a word is far more likely to begin with 's' or 'c' than 'x' or 'j'.

This does not require that the concatenation of hypotheses so far be saved or referenced. In fact, the computation required is equal to checking a single character of a string, rather than processing the entire thing. We use more memory by storing a pointer with each stack element, but we tremendously reduce the computation time. Thus we have the speed advantage of a postprocessing implementation with the same accuracy of a full lookup implementation.

A computer in conjunction with which the method of the present application may be used is described in detail in another United States patent application, namely Agulnick et al., "Control of a Computer Through a Position-Sensed Stylus," Ser. No. 07/610,231, filed Oct. 31, 1990. That application, including its appendices, are incorporated herein by reference. The appendices are all from GO Corporation of Foster City, Calif., and are entitled:

I. Architecture--Parts 0 to 5
II. Architecture--Parts 6 to End
III. Application Developer's Guide
IV. API Reference.

Another patent application which includes disclosure which may be used in conjunction with the present invention is the United States patent application of Carr et al., entitled "Computer Documents as Compound Documents in a Notebook Metaphor, " Ser. No. 07/607,139, filed Oct. 31, 1990. That application is also incorporated herein by reference.

DESCRIPTION OF THE PREFERRED EMBODIMENTS

Figure 1:
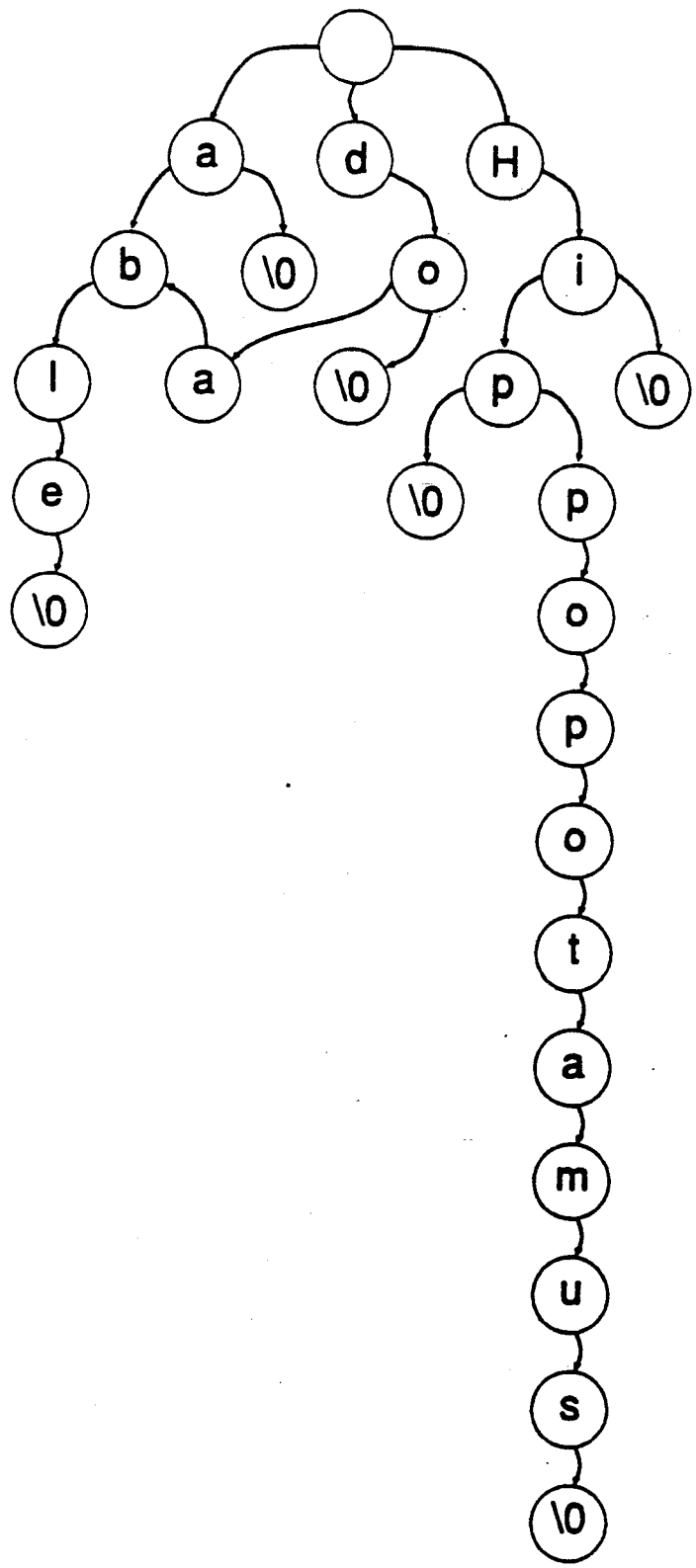
FIG. 1 illustrates a traditional trie.

The invention is intended to be used as a piece of a larger pattern recognition "engine." To better understand the invention, one must understand a piece of the larger application.

All the examples here and below are rendered in the C programming language (see *The C Programming Language;* Kernighan and Ritchie; Prentice Hall, Inc.), but it will be apparent to one skilled in the art that this process is applicable to other languages and even to mechanical implementations. Within the program listing the descriptive comments are begun with "/*" and ended with "*/". These two symbols are the standard delimiters for comments in the C programming language.

```
* THIS IS THE START OF THE PROGRAM LISTING */
```

```
* A prior art piece of computer software, the shape
matcher, accepts as input a set of digitized strokes and
produces as output a list of characters recognized, the
number of strokes used by each such character, and some
measure of likelihood of each character.
```

The returned data structure might look like this: */

```
The returned data structure might look like
this: */
typedef struct SHAPE_PROPOSAL
/* Character proposed */
unsigned char character;
/* number of strokes in character */
int strokes;
/* measure of confidence in character */
double probability;
} SHAPE_PROPOSAL;
/* And the subroutine might be declared like this: */
/* This subroutine returns the number of proposals */
int ShapeMatch(
/* pointer to digitized handwriting */
void *pStrokes,
/* Out: list of proposals */
SHAPE_PROPOSAL *pProposals
);
/* For example, if pStrokes pointed to three digitized
strokes (in some representation) which looked like a
capital 'H' whose crossbar didn't quite meet the right
vertical bar, ShapeMatch might return 2 (meaning that
there are two ways to interpret the strokes) and
pProposals might point to something like this:
    'H', 3, 0.4
```

```
't', 2, 0.6
signifying that it might be a capital 'H' (which would
explain the first three strokes) or it might be a
lower-case 't', which would explain the first two
strokes. ShapeMatch always returns its proposals in
alphabetical order. ShapeMatch always returns at least
one character as long as pStrokes is not equal to NULL.
We define ' 0×01' as an "unknown" character having one
stroke and a probability of 0.01 to guarantee that we can
always return something. ShapeMatch may return space as
the character with zero strokes.
```

There would also be a routine called StrokeIndex which allows the system to advance the stroke list pointer. This might be declared like this: */

```
/* This subroutine returns a pointer to new stroke list
void * StrokeIndex(
/* specify a name for the value of a null pointer */
#define NULL 0
    /* pointer to stroke list */
    void *pStrokes,
    /* number of strokes to skip over */
    int i
);
/* StrokeIndex(pStrokes,0) is always just pStrokes. In
our example above, StrokeIndex(pStrokes,1) would point to
the cross-bar on the 'H', and StrokeIndex(pStrokes,2)
would point to the right hand vertical bar. This allows
the recognition engine to advance through the list of
strokes using the number-of-strokes information returned
from ShapeMatch. StrokeIndex returns NULL if asked to
index beyond the end of the stroke list. For example, if
'H' were the only strokes in the list,
StrokeIndex(pStrokes,3) would return NULL.
```

The internal structure of ShapeMatch and StrokeIndex is not critical in the present invention.

We also define a Determinate Finite Automaton (DFA) from the following structures: */

```
typedef struct DFA_ELEMENT {
    /* a character proposal */
    unsigned char character;
    /* likelihood of this character */
    double probability;
    /* The state this character takes us to */
    struct DFA_STATE
        /* number of elements in this state */
        int count;
        /* pointer to elements in this state */
        struct DFA_ELEMENT *pDFAElement;
    } *pDFANextState;
} DFA_ELEMENT;
typedef struct DFA_STATE DFA_STATE;
/* Base of a pre-defined DFA */
extern DFA_STATE DFA[];
/* For this illustration, the DFA is considered to
represent a dictionary of the English language, but it
should be obvious that this representation can describe
any regular expression. Aho and Ullman and Knuth give
good algorithms for constructing DFA's from regular
expressions.
```

The DFA is an array of DFA_STATE structures. Each such structure contains a pointer to an array of DFA_ELEMENTS and a count of how many elements are in that array. Each element contains a character (which is a character that is allowed at this point in the translation), a probability (the likelihood that that character will in fact occur at this point in the translation), and a pointer back into the state array (which is the state the system is in if that character is in fact accepted).

Figure 2:
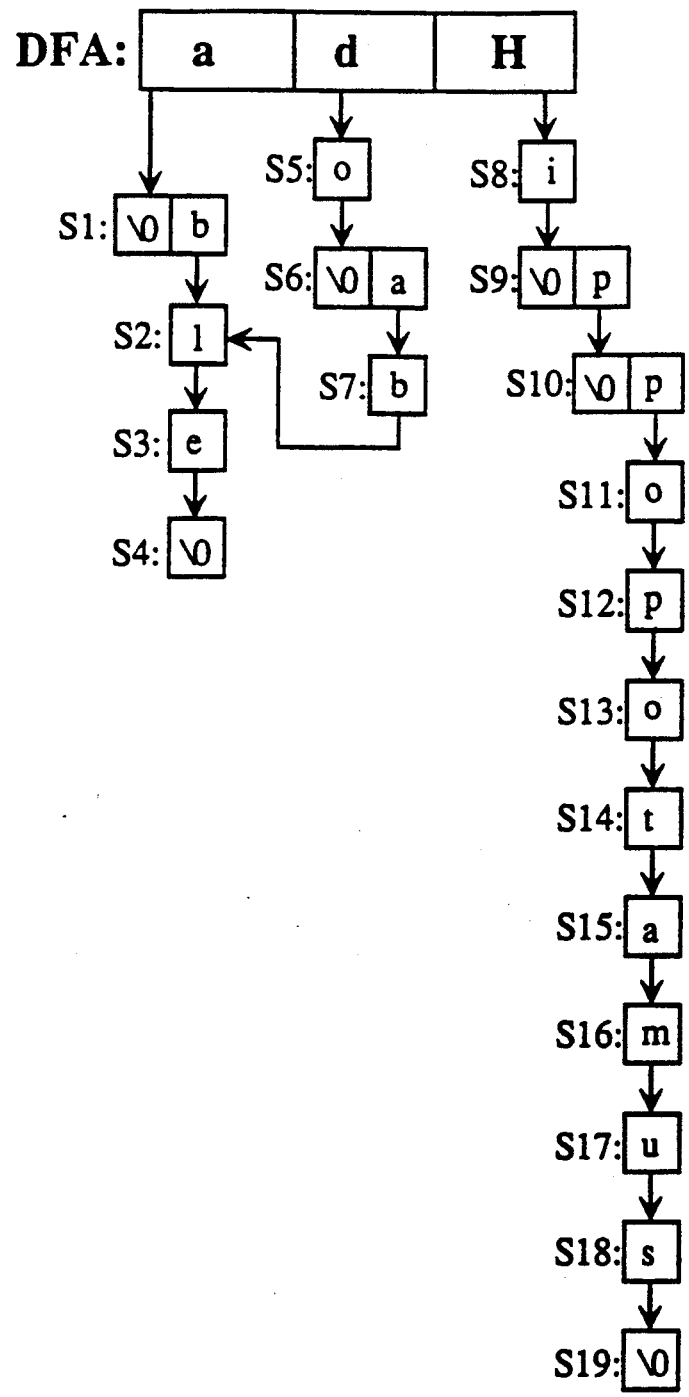
FIG. 2 illustrates a trie organized by state according to the present invention.

FIG. 2 illustrates how a very simple DFA (i.e. a trie) might be built from the seven strings:

```
a
able
do
doable
Hi
Hip
Hippopotamus
```

In the illustration, the first state contains 'a', 'd', and 'H', indicating that words in our little dictionary may only begin with those three letters. If we already know that a word begins with 'a', looking at the next state down shows us that the next letter must either be 'b' or 'O' (an ASCII null, binary zero, the end-of-string character in the C programming language). Note that in this representation of the trie, a single pointer suffices to represent all the possible words containing a particular prefix.

Of course, to properly allow parsing multi-word entries, the DFA needs to allow space as a character, and transition back to the top state if space is received.

An additional subroutine, DFAGetProposals, takes a pointer to a state and returns a list of proposals and states: */

```
typedef struct DFA_PROPOSAL
    /* character suggested */
    unsigned char character;
    /* state that character goes to */
    DFA_STATE *pDFAState;
    /* likelihood of that character */
    double probability;
} DFA_PROPOSAL;
/* This subroutine returns the number of proposals */
int DFAGetProposals(
    /* Pointer to a DFA state */
    DFA_STATE *pDFAState,
    /* Out: proposals from that state*/
    DFA_PROPOSAL *pDFAProposals
);
/* From the state-organized trie in FIG. 2, where the
boxed characters represent proposed letters, the arrows
represent pointers, and the alphanumerics to the left of
each set of boxes represent addresses, we can see that:
```

DFAGetProposals(DFA,pDFAProposals)

will return 3, and pDFAProposals will point to this:

```
a, S1
d, S5
H, S8
``` and if we then set pDFAState=S1

DFAGetProposals(pDFAState,pDFAProposals)

will return 2, and pDFAProposals will point to this:

| ' 0', | NULL |
|---|---|
| 'b', | S2 |

DFAGetProposals always returns its choices in alphabetical order.

If DFAGetProposals is passed a NULL for pDFAState, it will return 0. This is desirable behavior because users may write words that are not in the dictionary (i.e. not described by the DFA) so it is necessary to have a state that represents "out of bounds."

To merge the Shape proposals and the DFA proposals together into a single list of hypotheses, we define the following structure and subroutine: */

```
typedef struct HYPOTHESIS {
    /* Character considered at this point*/
    unsigned char character;
    /* Pointer to first stroke from left
    NOT used up to this point*/
    void *pStrokes;
    /* next state from this point */
    DFA_STATE *pDFAState;
    /* product of probabilities thus far */
    double probability;
} HYPOTHESIS;
/* Routine to compare two hypotheses by probability for
qsort in reverse order (most probable first) */
int HypCmp(HYPOTHESIS *pHyp1, HYPOTHESIS *pHyp2) {
    if (pHyp1->probability > pHyp2->probability) {
        return (-1);
    }
    if (pHyp1->probability < pHyp2->probability) {
        return (1);
    }
    return (0);
}
/* This subroutine returns the number of entries in the
output list */
int MakeHypotheses
    /* Current stroke list */
    void * pStrokes,
    /* list of shape proposals */
    SHAPE_PROPOSAL *pShapeProposals,
    /* number of shape proposals */
    int shapeCount,
    /* list of DFA proposals */
    DFA_PROPOSAL *pDFAProposals,
    /* number of DFA proposals */
    int dfaCount,
    /* best so far */
    double bestProbability,
    /* probability of prefix string up to here */
    double oldProbability,
    /* Out: hypothesis list */
    HYPOTHESIS *pHypotheses
){
/* This routine is called after a shape proposal list and
a DFA proposal list have been generated to merge them
into a hypothesis structure. Because both the shape list
and the DFA list are in alphabetical order, the routine
is straightforward: */
int count;
    /* saved pointer to beginning of hypothesis list*/
    HYPOTHESIS *pHypotheses0;
    count = 0;
    pHypotheses0 = pHypotheses;
    while (shapeCount > 0 && dfaCount > 0) {
/* If a character matches from the two lists, we put that
character into the hypothesis list, advance the stroke
list pointer, advance the DFA, set the new probability,
consume one shape proposal and one DFA proposal, and
actually add this to the hypothesis list if it isn't
pointless. */
        if (pShapeProposals->character ==
            pDFAProposals->character)
            pHypotheses->character =
                pShapeProposals->character;
            pHypotheses->pStrokes =
                StrokeIndex(pStrokes,pShapeProposals->strokes);
            pHypotheses->pDFAState =
                pDFAProposals->pDFAState;
            pHypotheses->probability =
                pShapeProposals->probability *
                pDFAProposals->probability * oldProbability;
            --shapeCount;
            ++pShapeProposals;
            --dfaCount;
            ++pDFAProposals;
/* If there has already been a full translation that had
a higher probability than this fragment, there is no
point in putting it into the list, since adding more
characters can only make the probability lower. */
            if (pHypotheses->probability >= bestProbability) {
                ++count;
                ++pHypotheses;
            }
        }
/* if we have a shape proposal with no matching DFA
proposal, we still accept it, but we drop its probability
by a factor of 10. Any expansion of this will have an
empty DFA proposal list. */
        else if (pShapeProposals->character <
            pDFAProposals->character) {
            pHypotheses->character =
                pShapeProposals->character;
            pHypotheses->pStrokes =
                StrokeIndex(pStrokes,pShapeProposals->strokes);
            pHypotheses->pDFAState = NULL;
            pHypotheses->probability =
                pShapeProposals->probability * 0.1 *
                oldProbability;
            --shapeCount;
            ++pShapeProposals;
            if (pHypotheses->probability >= bestProbability) {
                ++count;
                ++pHypotheses;
            }
        }
/* We simply skip DFA proposals that have no matching
shape proposals. Just because, any word CAN begin with
any letter of the alphabet doesn't mean we have to
consider all of them seriously */
        else {
            --dfaCount;
            ++pDFAProposals;
        }
    }
/* It is possible that we will run out of DFA proposals
before we run out of shape proposals. For example, there
may not have been any DFA proposals at all. This code is
equivalent to the code above for shape proposals without
matching DFA proposals. */
    while (shapeCount > 0) {
        pHypotheses->character =
            pShapeProposals->character;
        pHypotheses->pStrokes =
            StrokeIndex(pStrokes,pShapeProposals->strokes);
        pHypotheses->pDFAState = NULL;
        pHypotheses->probability =
            pShapeProposals->probability * 0.1 *
            oldProbability;
        --shapeCount;
        ++pShapeProposals;
        if (pHypotheses->probability >= bestProbability) {
            ++count;
            ++pHypotheses;
        }
    }
    /* Sort by probability, highest first */
    qsort(pHypotheses0, count, sizeof(HYPOTHESIS),
        HypCmp);
    return (count);
}
/* Note that this implementation of MakeHypotheses
requires that no letter appears twice in either list. By
definition, this cannot happen with the DFA, but there
are a very few characters for which ShapeMatch could
return the same letter with different stroke counts.
This can be got around by defining different bytes to
represent (for example) an 'i' with a dot and an 'i'
without one.
```

Finally, we need a routine that scans a hypothesis list updating bestString and bestProbability when it finds hypotheses that use up all the strokes, and returning the number of left-over hypotheses whenever it finds a hypothesis with strokes still to be analyzed. It also updates the currentHypothesis number on the stack (explained below). */

```
typedef struct STACK_ELEM {
    /* Number of hypotheses */
    int count;
    /* list of hypotheses */
    HYPOTHESIS *pHypotheses;
    /* hypothesis to consider next */
    int currentHypothesis;
} STACK_ELEM;
int HypothesisProcess(
    STACK_ELEM *pStackElem,
    int stackIndex,
    double *pBestProbability,
    char *pBestString,
    char *pCurrString
){
    HYPOTHESIS *pHypothesis;
    int count;
/* Get a pointer into the current hypothesis list to the
next hypothesis we need to deal with and compute a count
of the number remaining to deal with */
    pStackElem += stackIndex;
    pHypothesis = pStackElem->pHypotheses +
        pStackElem->currentHypothesis;
    count = pStackElem->count -
        pStackElem->currentHypothesis;
    while (count > 0) {
        /* Update the current string */
        pCurrString[stackIndex] = pHypothesis->character;
    /* If one of these hypotheses actually has strokes left
    in it, return now so that can be dealt with */
        if (pHypothesis->pStrokes) {
            ++pStackElem->currentHypothesis;
            return (count);
        }
    /* Otherwise, we're pointing to a fully-analyzed
    hypothesis; see if it beats the best score so far, and if
    so, keep track of it */
        *pBestHypothesis = pHypothesis->probability;
        if (pHypothesis->probability > *pBestProbability) {
            strcpy(pBestString,pCurrString);
        } --count;
    }
/* If we got here, that means we exhausted this
hypothesis list, which means the next routine up should
pop the stack */
    return (0);
}
/* All of these routines are called from within a
subroutine called TranslateHandwriting, which is defined
as follows: */
/* This subroutine returns the probability of the
returned string*/
double TranslateHandwriting(
    /* pointer to a list of strokes to translate */
    void *pStrokes,
    /* Out: ASCII translation */
    char *pString
){
/* As its name implies, this routine takes a pointer to a
series of digitized strokes and returns an ASCII string
that represents what was written. In the case of our
first example, it should return "Hippopotamus". */
```

As described in the literature (see "A Verifier of Lexical Hypotheses in a Speech Recognition System" by Rivoira and Torasso, cited above), this routine works by traversing the tree of possible translations, eliminating branches of low probability. However, we also traverse the DFA in tandem, greatly enhancing our ability to avoid unlikely translations and thus increasing the speed and accuracy of the translation.

Since there will be one stack element for every translated character, we'll arbitrarily assume that no one can fit more than 132 characters on a single line. TranslateHandwriting looks like this: */

```
    /* Hypothesis Stack */
    STACK_ELEM stack[132];
    /* Current Hypothesis */
    int stackIndex = 0;
    /* probability of best full translation so far */
    double bestProbability = 0.0;
    double currProbability;
    /* best matching string */
    unsigned char bestString[132];
    /* current partial string */
    unsigned char currString[132];
    /* temp storage for DFA proposals */
    DFA_PROPOSAL dfaProposals[256];
    /* DFA State being evaluated */
    DFA_STATE *DFAState;
    /* temp storage for shape proposals */
    SHAPE_PROPOSAL shapeProposals[256];
    /* temp storage for hypotheses */
    HYPOTHESIS hypotheses[256];
    /* pointer to current hypothesis */
    HYPOTHESIS *pHypothesis;
    int shapeCount, dfaCount, hypCount;
/* Start at the top of the DFA and the beginning of the
stack. The stroke pointer was passed in and already
points to the left-most stroke */
    pDFAState = DFA;
    stackIndex = 0;
    currProbability = 1.0;
    while (1) {
    /* Create a new stack entry; merge a new set of shape and
    DFA proposals into a new hypothesis list, and put all the
    relevant information into the new stack element */
        shapeCount = ShapeMatch(pStrokes,shapeProposals);
        dfaCount = DFAGetProposals(pDFAState,dfaProposals);
        hypCount =
            MakeHypotheses(pStrokes,shapeProposals,shapeCount,
                dfaProposals,dfaCount,
                bestProbability,currProbability,hypotheses);
        stack[stackIndex].count = hypCount;
        stack[stackIndex].pHypotheses =
            (HYPOTHESIS *)malloc(hypCount*sizeof
            (HYPOTHESIS));
        memcpy(stack[stackIndex].pHypotheses,hypotheses);
        stack[stackIndex].currentHypothesis = 0;
    Hypothesis process goes down the hypothesis list
    updating bestString and bestProbability when it finds
    hypotheses that use up all the strokes, and returning the
    number of left-over hypotheses whenever it finds a
    hypothesis with strokes still to be analyzed. It also
    updates the currentHypothesis (which may be referred to
    as the "current active hypothesis") number on the
    stack. When it returns to zero, that means this hypothesis
    list is exhausted and we should pop the stack. When we can't
    pop the stack any further, we've completed the analysis */
        while (HypothesisProcess(stack,stackIndex,
            &bestProbability, bestString, currString) == 0) {
            if (stackIndex == 0) {
                strcpy(pString,bestString);
                return (bestProbability);
            }
            free(stack[stackIndex].pHypotheses);
            --stackIndex;
        }
    /* At this point, the current hypothesis still has
    strokes to be analyzed, so we need to set up to push
    another element on the stack */
        pHypothesis = stack[stackIndex].pHypotheses +
            stack[stackIndex].currentHypothesis;
        pStrokes = pHypothesis->pStrokes;
        pDFAState = pHypothesis->pDFAState;
        currProbability = pHypothesis->probability;
        ++stackIndex;
    } /* end of while (true) loop */
} /* end of TranslateHandwriting */
/* THIS IS THE END OF THE PROGRAM LISTING */
```

The embodiment so far described contains two "experts": ShapeMatch and DFAGetProposals. ShapeMatch has the power to propose new characters and to veto other proposals. DFAGetProposals can affect the probability of other proposals, but cannot propose on it sown, nor can it veto proposals. In an alternative embodiment including multiple experts representing different types of information, such as vertical position, gross character shape, punctuation, case, numeric information, etc. and in which several of the experts are allowed to propose, it becomes easier to use a single proposal table of 256 entries (one per character) that all the experts update, rather than having each expert produce a separate list of proposals that another routine merges into a composite hypothesis list. Each element of this table would look like this:

```
typedef int EXPERT1_STATE;
typedef struct PROPOSAL_TABLE {
    /* cumulative probability */
    double probability;
    /* number of experts proposing this */
    int proposed;
    /* number of experts vetoing it */
    int vetoed;
    struct expert1 {
        EXPERT1_STATE *pExpertState;
    } expert1;
    struct expert2 {
        EXPERT2_STATE *pExpert2State;
    } expert2;
    .
    .
    .
};
```

The probability must be initialized to 1.0, and the proposed and vetoed counts must be initialized to 0. Each expert must increment the proposed count on each character it proposes for this position, increment the vetoed count on each character it vetoes for this position, multiply the probability by the probability it assigns to each character, and update its state pointer in each character to reflect the state that expert transitions to should that character be expanded later.

To be hypothesized, a character must be proposed at least once and must not be vetoed at all.

What is claimed is:

1. A method for handwriting translation including a deterministic finite automaton traversal subroutine, and a dynamic programming subroutine, comprising the steps of:

deriving character proposals and corresponding probabilities from an input of digitized strokes and storing a pointer to the strokes not yet analyzed;

deriving a separate list of character proposals, probabilities, and new states from the deterministic finite automaton traversal subroutine;

merging the two character proposal lists into a single list of hypotheses, that are sorted by probability;

expanding each of those hypotheses in order from most to least probable;

deriving a new list of proposals from the strokes not yet analyzed with a shape matching subroutine and storing a pointer to the strokes still not yet analyzed;

deriving a new list of proposals from the DFA traverser using the state previously stored with the hypothesis being expanded; and repeatedly expanding said hypotheses until a list of translations is produced.

2. The handwriting translation method of claim 1, further including the step of generating hypotheses from multiple experts with veto and propose power, the generating step including the steps of:

defining a common proposal table with an entry for every possible character and containing a common probability value, a common veto count, a common proposal count, and a separate state value for every expert;

initializing the table probabilities to 1.0 and the common veto count to zero and the common count to zero;

directing each expert to increment the veto count for characters it rejects, increment the propose count for characters it proposes, multiply its judgement of the probabilities of each character by the cumulative probability so far, and set its state pointer to the state it would be in if this character were accepted; and hypothesizing all characters with non-zero probability, non-zero proposal counts, and zero veto counts.

3. The method of claim 1, including a shape matching subroutine, wherein the step of deriving character proposals and corresponding probabilities is carried out utilizing the shape matching subroutine.

4. The handwriting translation method of claim 2, wherein the step of defining a common proposal table is carried out by using a plurality of experts.

5. A method for recognition of sequences of characters, including the steps of:

(1) storing a plurality of input strokes which are in a sequence;

(2) generating a first set of recognition hypotheses for a first subset of said strokes, beginning at one end of the sequence of strokes, each hypothesis including: (i) a hypothesized character, (ii) the number of strokes required to construct the hypothesized character, and (iii) a probability assigned to the hypothesized character;

(3) comparing each hypothesized character with a predetermined database of character sequences;

(4) for each hypothesized character which is found as a first character in the predetermined database of character sequences, generating a pointer which is correlated with that hypothesis and which points to that character's position in the database;

(5) for each character which is not found as a first character in the predetermined database of character sequences, assigning a lower probability to that character's recognition hypothesis;

(6) designating the recognition hypothesis having the highest probability as the current active hypothesis in the set of recognition hypotheses of which that recognition hypothesis is a member;

(7) placing that set of recognition hypotheses as the first element on a stack of sets of recognition hypotheses;

(8) from a plurality of strokes following the last stroke which is a part of the current active hypothesis from the set of recognition hypotheses at the top of the stack, generating a new set of new recognition hypotheses, each said new recognition hypothesis including: (i) a hypothesized character, (ii) the number of strokes required to construct the hypothesized character, and (iii) a probability assigned to the hypothesized character;

(9) replacing the probability assigned to each new recognition hypothesis with a value derived from the current value of the probability for the new recognition hypothesis and the value of the probability of the current active hypothesis from the set of recognition hypotheses at the top of the stack;

(10) if the current active hypothesis from the set of recognition hypotheses at the top of the stack has an assigned pointer to the database, then for each new hypothesis which is found in the predetermined database of character sequences as a new character following the character corresponding to said current active hypothesis, generating a pointer which is correlated with that hypothesis and which points to the new character's position in the database;

(11) if the current active hypothesis from the set of the recognition hypotheses at the top of the stack does not have an assigned pointer to the database, then for each new hypothesis, reduce the probability of every recognition hypotheses in the new set by a predetermined factor;

(12) designating the recognition hypothesis which is a member of the new set of recognition hypotheses and which has the highest probability in that set as the current active hypothesis in that set;

(13) placing the new set of recognition hypotheses on top of the stack;

(14) repeating steps 8 through 13, until no additional strokes are found in step 8 following the last stroke which is a part of the current active hypothesis from the set of recognition hypotheses at the top of the stack;

(15) generating a first hypothesis string from the current active hypothesis of each set of recognition of hypotheses, in order from the bottom of the stack to the top;

(16) generating a probability for the first hypothesis string, based upon the value of the probability for the current active hypothesis from the set of recognition hypotheses at the top of the stack;

(17) storing the first hypothesis string as the best hypothesis string and storing its probability as the best probability, and proceeding to step 20;

(18) generating a new hypothesis string from the current active hypothesis of each set of recognition of hypotheses, in order from the bottom of the stack to the top;

(19) generating a probability for the new hypothesis string, based upon the value of the probability for the current active hypothesis from the set of recognition hypotheses at the top of the stack;

(20) if the probability of the new hypothesis string is higher than the stored best probability, storing the new hypothesis string as the best probability string and storing its probability as the best probability;

(21) if the set of recognition hypotheses at the top of the stack includes a subset of at least one other recognition hypothesis having a probability lower than the current active hypothesis, then designating the recognition hypothesis of said subset which has the highest probability value as the current active hypothesis and repeating steps 8-14 and 18-20;

(22) removing the set of recognition hypotheses at the top of the stack, and if the stack is not empty as a result of such removal, proceeding to step 21, but if it is empty then proceeding to step 23; and

(23) outputting the best stored string.

6. The method of claim 5, wherein step 21 is carried out only if the probability of the new subset is greater than the probability of the current string.

7. A method for generating a sequence of characters from a set of input strokes, including the steps of:
(1) generating at least one shape proposal corresponding to a first subset of the plurality of input strokers;
(2) generating a probability for each of the shape proposals generated in step 1;
(3) generating a plurality of hypothesis lists including the shape proposals;
(4) maintaining a stack of hypothesis lists, with one hypothesis in each hypothesis list being designated as a current active hypothesis, the stack being ordered from a beginning of the plurality of input strokes to an end thereof, wherein each list of hypotheses is determined from the current active hypothesis in the list directly below it on the stack, and herein the current active hypothesis from the hypothesis list at the top of the stack utilizes all input strokes to be analyzed;
(5) generating a string including the shape proposals corresponding to each of the current active hypotheses from the hypothesis lists on the stack, in order from bottom to top;
(6) generating a probability for each such string form the probabilities of the individual shape proposals corresponding to the current active hypotheses which form the string, wherein the probability for each string which is not represented in a predetermined database is reduced in a predefined manner;
(7) outputting a string as generated in step 5 having the highest probability as generated in step 6.

8. The method of claim 7, wherein maintaining the stacks as specified in step 4 includes the step of generating all possible variations of current active hypotheses from the hypothesis lists in the stack.

9. The method of claim 8, wherein the step of reducing the probability as in step 6 the step of multiplying the generated probability by a predetermined factor for each shape proposal in the new hypothesis list.

10. The method of claim 7, wherein the shape proposals generate din step 1 are selected from a predefined set of known shape proposals and a character signifying that the subset of the strokes does not correspond to any of the known shape proposals.

11. The method of claim 10, wherein step 6 includes the steps of:
(8) determining whether nay of the shape proposals generated in step 1 is a character signifying that the subset of the strokes does not correspond to any known shape proposal; and
(9) if the determination of step 8 is positive, modifying the generated probability for each hypothesis list including said character signifying that the subset of the strokes does not correspond to any of the known shape proposals.

12. The method of claim 11, wherein step 9 includes the steps of:
(10) determining whether any of the shape proposals generated in step 1 is a character signifying that the subset of the strokes does not correspond to any known shape proposal; and
(11) if the determination of step 10 is positive, then generating at least one alternative shape proposal to replace that character, where the alternative shape proposal is selected such that a resulting hypothesis list matches a sequence of characters in a predefined dictionary.

13. The method of claim 7, wherein the probabilities of step 2 are generated according to the likelihood of the correctness of each shape proposal.

* * * * *